(12) United States Patent
Boesch et al.

(10) Patent No.: US 7,116,068 B2
(45) Date of Patent: *Oct. 3, 2006

(54) DIAGNOSTIC SYSTEM AND METHOD FOR AN ELECTRIC MOTOR USING TORQUE ESTIMATES

(75) Inventors: Mathew Boesch, Plymouth, MI (US); Vijay Garg, Canton, MI (US); Abbas Raftari, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

This patent is subject to a terminal disclaimer.

(21) Appl. No.: 10/745,276

(22) Filed: Dec. 23, 2003

(65) Prior Publication Data

US 2004/0134267 A1    Jul. 15, 2004

Related U.S. Application Data

(63) Continuation-in-part of application No. 10/644,382, filed on Aug. 20, 2003, which is a continuation-in-part of application No. 10/063,345, filed on Apr. 12, 2002, now abandoned.

(51) Int. Cl.
*H02K 21/00* (2006.01)
*H02K 23/00* (2006.01)
*H02K 31/00* (2006.01)
*H02P 1/18* (2006.01)
*H02P 3/08* (2006.01)

(52) U.S. Cl. .................... 318/254; 318/798; 318/560
(58) Field of Classification Search .................. None
See application file for complete search history.

(56) References Cited

U.S. PATENT DOCUMENTS

| | | | |
|---|---|---|---|
| 5,107,195 A | | 4/1992 | Lyons et al. |
| 5,272,429 A | * | 12/1993 | Lipo et al. .................. 318/808 |
| 5,343,970 A | | 9/1994 | Severinsky et al. |
| 5,345,158 A | | 9/1994 | Kilman et al. |
| 5,418,440 A | | 5/1995 | Sakaguchi et al. |
| 5,477,163 A | | 12/1995 | Kilman et al. |
| 5,689,170 A | | 11/1997 | Ishikawa |
| 5,699,253 A | | 12/1997 | Puskorius et al. |
| 5,732,382 A | | 3/1998 | Puskorius et al. |
| 5,844,385 A | | 12/1998 | Jones et al. |
| 5,864,217 A | | 1/1999 | Lyons et al. |
| 5,867,004 A | | 2/1999 | Drager et al. |
| 5,998,954 A | * | 12/1999 | Scholten .................. 318/599 |
| 6,005,364 A | | 12/1999 | Acarnley |
| 6,067,801 A | | 5/2000 | Harada et al. |
| 6,135,914 A | | 10/2000 | Yamaguchi et al. |
| 6,155,954 A | | 12/2000 | Itoyama et al. |
| 6,173,226 B1 | * | 1/2001 | Yoshida et al. ............... 701/51 |
| 6,193,628 B1 | | 2/2001 | Hrovat et al. |
| 6,208,034 B1 | | 3/2001 | Yamaguchi |

(Continued)

FOREIGN PATENT DOCUMENTS

JP    08237985 A    9/1996

(Continued)

*Primary Examiner*—Lincoln Donovan
*Assistant Examiner*—Erick Glass
(74) *Attorney, Agent, or Firm*—David B. Kelley; Brooks & Kushman

(57) ABSTRACT

A system and method for diagnosing a potential electrical operating discrepancy in a polyphase electric motor by generating two independent torque estimates using a plurality of current sensors and, optionally, a shaft position sensor. Differences between the independent torque estimates are used to indicate potential discrepancies in electrical operating characteristics of the motor.

14 Claims, 3 Drawing Sheets

U.S. PATENT DOCUMENTS

| | | |
|---|---|---|
| 6,211,633 B1 | 4/2001 | Jones et al. |
| 6,219,607 B1 | 4/2001 | Piepenbrink et al. |
| 6,490,511 B1 | 12/2002 | Raftari et al. |
| 6,553,287 B1 | 4/2003 | Supina et al. |
| 6,668,202 B1 * | 12/2003 | Makino et al. ............... 700/56 |
| 6,736,236 B1 * | 5/2004 | Kurishige et al. .......... 180/446 |
| 6,756,757 B1 * | 6/2004 | Marcinkiewicz et al. ... 318/432 |
| 2002/0117990 A1 | 8/2002 | Sawada et al. |
| 2004/0134267 A1 * | 7/2004 | Boesch et al. ............. 73/118.1 |
| 2004/0168844 A1 * | 9/2004 | Goransson et al. ......... 180/242 |
| 2005/0062451 A1 * | 3/2005 | Takemori et al. ........... 318/685 |

FOREIGN PATENT DOCUMENTS

| | | |
|---|---|---|
| JP | 10323072 A * | 12/1998 |
| JP | 11031014 A * | 2/1999 |
| JP | 11184512 A | 7/1999 |
| JP | 2000287472 A * | 10/2000 |

* cited by examiner

DIAGNOSTIC SYSTEM AND METHOD FOR AN ELECTRIC MOTOR USING TORQUE ESTIMATES

CROSS-REFERENCE TO RELATED APPLICATIONS

This application is a continuation-in-part of U.S. application Ser. No. 10/644,382, filed Aug. 20, 2003, which is a continuation-in-part of application Ser. No. 10/063,345, filed Apr. 12, 2002, now abandoned, entitled "Diagnostic Method For An Electric Motor Using Torque Estimates", now abandoned. These applications are owned by the assignee of this application.

BACKGROUND OF THE INVENTION

1. Field of the Invention

The present invention relates generally to an electrically powered vehicle, such as an electric vehicle (EV), a hybrid electric vehicle (HEV) or a fuel cell vehicle (FCV). More specifically the invention relates to a strategy to diagnose a potential deviation from desired operating characteristics of an electric motor.

2. Background Art

The invention may be used in a hybrid electric vehicle of the type schematically shown in FIG. 1 of co-pending application Ser. No. 09/683,026, filed Nov. 9, 2001, which issued on Feb. 10, 2004 as U.S. Pat. No. 6,688,411; in FIG. 1 of co-pending application Ser. No. 09/712,436, filed Nov. 14, 2000 which issued on Dec. 16, 2003 as U.S. Pat. No. 6,664,657; in co-pending application Ser. No. 10/063,345, filed Apr. 12, 2002, now abandoned; and in co-pending application Ser. No. 09/966,612, filed Oct. 1, 2001, which issued on May 11, 2004 as U.S. Pat. No. 6,735,502. Each of these co-pending applications is assigned to the Assignee of the present invention. The disclosures of these applications are incorporated herein by reference.

The need to reduce fossil fuel consumption and emissions in automobiles and other vehicles predominately powered by internal combustion engines (ICEs) is well known. Vehicles powered by electric motors attempt to address that need. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV may have a variety of configurations. Prior art HEV patents disclose systems in which an operator is required to select between electric motor operation and internal combustion engine operation. In other configurations, the electric motor drives one set of wheels and the ICE drives a different set. These include, for example, a series-hybrid electric vehicle (SHEV) configuration. A series-hybrid electric vehicle has an engine (typically an ICE) connected to an electric motor/generator. The motor/generator, in turn, provides electric power to a battery and a traction motor. In the SHEV, where the traction motor functions as the sole source of wheel torque, there is no direct mechanical connection between the engine and the drive wheels.

A parallel/series hybrid electric vehicle (PSHEV) powertrain has characteristics of both PHEV, described below, and SHEV configurations. It sometimes is referred to as a "split" configuration. In one of several types of PSHEV configurations, the ICE is mechanically coupled to two electric motors in a planetary gear transaxle. A first electric motor, the motor/generator, is connected to a sun gear. The ICE is connected to a planetary carrier. A second electric motor, a traction motor, is connected to a ring (output) gear via additional gearing in a transaxle. Engine torque can power the generator to charge the battery. The generator can also contribute to the necessary wheel (output shaft) torque. The traction motor is used to both contribute wheel torque and to recover braking energy to charge the battery. In this configuration, the generator can selectively provide a reaction torque that may be used to control engine speed. In fact, the engine, motor/generator and traction motor can provide a continuous variable transmission (CVT) effect.

HEV powertrains of this type present an opportunity to better control engine idle speed, compared to conventional vehicles, by using the generator to control the engine.

A parallel hybrid electrical vehicle (PHEV) powertrain configuration has an engine (typically an ICE) and an electric motor that work together in varying degrees to provide the necessary wheel torque to power the vehicle. Additionally, in a PHEV configuration, the motor can be used as a generator to charge the battery from the power produced by the ICE.

Parallel hybrid electric vehicles of known design include an internal combustion engine and an electric motor, typically a high voltage induction motor, which establish parallel power flow paths to vehicle traction wheels. The powertrain has two power sources. The first power source is a combination of an engine and a generator subsystem with a planetary gear set for distributing power through separate power flow paths. The second is an electric drive system comprising a motor, a generator and a battery. The battery acts as an energy storage medium for the generator and the motor. The generator, in a parallel hybrid powertrain, is driven by the engine.

A mechanical power flow path is established between the engine and the transmission torque output shaft. The other power flow path is an electrical power flow path, which distributes power from the engine to the generator, the latter driving the torque output shaft of the transmission through gearing.

When the powertrain is operating with the first power source, engine power is divided between the two paths by controlling the generator speed, which implies that the engine speed can be decoupled from the vehicle speed. That is, the powertrain can act in a manner similar to a continuously variable transmission, where vehicle speed changes do not depend upon engine speed changes. This mode of operation is referred to as a positive split.

The powertrain can act also in a mode of operation that may be referred to as a negative split. In this instance, the planetary gearing will permit the generator to drive the planetary gear set to drive the engine. The combination of the motor, the generator and the planetary gear set thus function as an electromechanical, continuously variable transmission.

When a generator brake is activated, the powertrain will act in the so-called parallel mode in which engine power output is transmitted with a fixed gear ratio solely through a mechanical power flow path in the drivetrain.

When the first power source is active, it can provide only forward propulsion since there is no reverse gear. The engine requires either a generator speed control or a generator brake to transmit engine output power to the drivetrain for forward motion. When the second power source is active, the electric motor draws power from the battery and provides propulsion independently of the engine for driving the vehicle forward and in reverse. The generator, at that time, can draw power from the battery and drive against a reaction brake on the engine output shaft to propel the vehicle forward. This mode of operation is called "generator drive."

As pointed out above, combining an ICE with an electric motor provides a potential for reducing vehicle fuel consumption and emissions with no appreciable loss of vehicle performance or driveability. The HEV allows the use of smaller engines, regenerative braking, electric boost, and even operation of the vehicle with the engine shut down.

One such area of development for optimizing potential benefits of a hybrid electric vehicle involves calculating torque estimates delivered by an electric motor or motors. An effective and successful HEV design (or any vehicle powertrain propelled by electric motors and optionally capturing regenerative braking energy) requires reliable operation that can be improved through careful diagnosis of electric motor operation. Thus there is a need for a strategy to effectively detect potential discrepancies in electrical operating conditions in an electric motor propelled vehicle's electrical components and sub-systems.

Previous efforts have used rotor position sensors or estimates as part of the control strategy for an electric motor. For example, Jones et al. (U.S. Pat. No. 6,211,633) disclose an apparatus for detecting an operating condition of a machine by synchronizing sampling instants with the machine condition so that reliability data are obtained. The operating condition may be the position of the rotor, in which case estimates of the rotor position and rotor velocity at each of the sampling instants are developed.

Lyons et al. (U.S. Pat. No. 5,864,217) disclose an apparatus and method for estimating rotor position and commutating a switched reluctance motor (SRM), using both a flux/current SRM angle estimator and a toothed wheel generating a magnetic pickup. Phase errors can be compensated by adjusting the angle input to the commutator as a function of estimated speed. Alternately, the flux/current SRM angle estimator can be run in background mode to tune the toothed wheel interrupt angle signal at different speeds.

Drager et al. (U.S. Pat. No. 5,867,004) disclose a control for operating an inverter coupled to a reluctance machine that includes a relative angle estimation circuit for estimating rotor angle for a phase in the reluctance machine.

Lyons et al. (U.S. Pat. No. 5,107,195) disclose a method and apparatus for indirectly determining rotor position in a reluctance motor that is based on a flux/current model of the machine, which model includes multi-phase saturation, leakage, and mutual coupling effects.

Lastly, Acarnley (U.S. Pat. No. 6,005,364) discloses a motor monitoring and control circuit that calculates a value parameter for a position of the motor at given instants. The same parameter (which may be position or speed of a rotor) is then measured at subsequent instants. These values are used to compute a future value of the parameter.

The use of two independent torque estimates to diagnose a potential fault in the electric motor of an electric motor propelled vehicle is unknown in the prior art.

SUMMARY OF THE INVENTION

The present invention can determine two independent electric motor torque estimates using a plurality of current transducers and optionally a shaft position sensor for the traction motor.

The powertrain of the present invention maintains power flow paths when the motor subsystem is inactive. The strategy of the present invention will permit the powertrain to be operated without the motor being active and, in this way, a so-called "quit-on-the-road" condition is avoided.

The powertrain engine and the motor generator subsystem function together seamlessly as they deliver torque through a gear system to the vehicle traction wheels. The performance limits of the battery subsystem are not exceeded. When the powertrain is operating under normal conditions with the motor active, the vehicle controller interprets the driver's input (i.e., the reverse, neutral and drive transmission selections and the acceleration or deceleration demand), and then determines when and how much torque each power source needs to meet the driver's demand and to achieve a specified vehicle performance. The vehicle system controller will determine operating speed and torque for the engine to achieve a desired fuel economy and an acceptable level of exhaust gas emissions.

Accordingly, the present invention includes a powertrain controller with a strategy to effectively detect the operating condition in an electric-motor-propelled vehicle's electrical components and subsystems by creating two independent torque estimates of an electric motor for a hybrid electric vehicle (HEV) using a plurality of current transducers and, optionally, a shaft position sensor. Discrepancies between the two independent torque estimates or the signals used to create the two independent torque estimates can be indicative of potential discrepancies in electrical operating conditions such as a stray current leakage condition.

More specifically, the invention provides a strategy to generate two independent torque estimates for a multiple-phase (polyphase) electric motor. In the case of a three-phase electric motor, the power train controller uses first and second systems to determine current in the motor phase, third and fourth systems to generate a first and second estimate of motor shaft position, and fifth and sixth systems to generate first and second estimates of motor torque using the first and second systems and the first and second estimates of motor shaft position.

In the case of a three-phase electric motor, the strategy uses four current sensors to generate four measured currents, which are used for the first and second systems to determine current in each motor phase. The estimate of motor shaft position can be made using Kalman filters. Alternatively the motor shaft position estimate can be made using a resolver.

The preceding description refers to a three-phase electric motor. The invention is applicable, however, for use with electric motors having more than three phases. That is, it is applicable to a polyphase electric motor having any number of phases "n"; i.e., four, five, six or more phases.

In an electric motor having "n" phases, there will be n−1 current sensors for each torque estimate. Thus, with a three-phase motor, there would be two current sensors (i.e., n−1 sensors). The current sensor outputs are used to calculate torque. Each torque estimate of the motor requires two current sensors. For example, in a six-phase motor, five current sensors are needed (i.e., n−1=5) to create one torque estimate of the motor. But since two torque estimates are needed for the motor drive, the strategy of the invention requires five additional sensors. These five additional sensors are independent of the first five as the second torque estimate for the motor drive is developed.

Other objectives and features of the present invention will become more apparent to persons having ordinary skill in the art to which the present invention pertains from the following description, taken in conjunction with the accompanying figures.

BRIEF DESCRIPTION OF THE DRAWINGS

The foregoing advantages and features, as well as other advantages and features, will become apparent with reference to the description and figures below, in which like numerals represent like elements and in which.

DETAILED DESCRIPTION OF THE PREFERRED EMBODIMENT(S)

Figure 1:
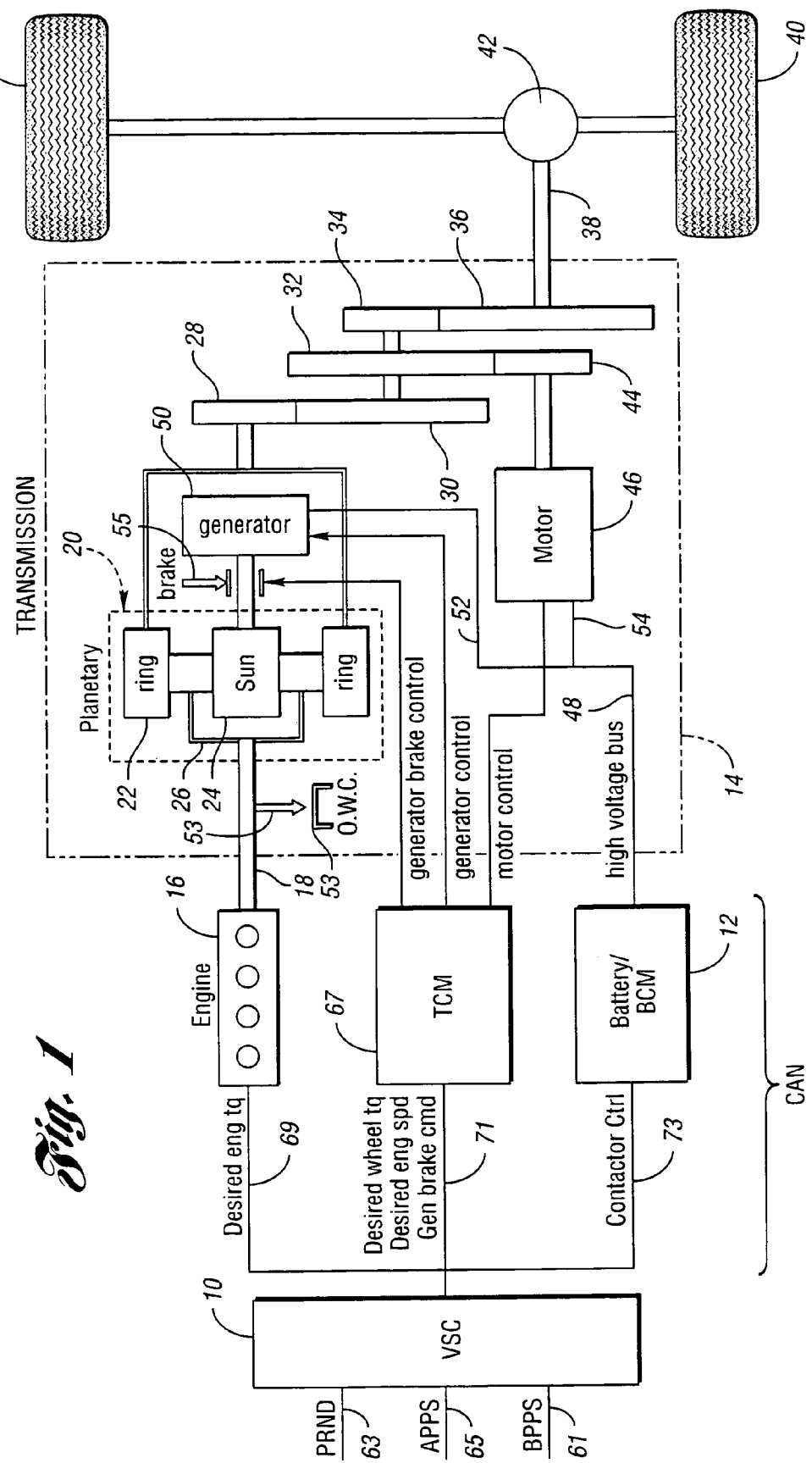
FIG. 1 illustrates a general hybrid electric vehicle (HEV) configuration of the type disclosed in the co-pending application identified in the foregoing "Background of Invention", which may incorporate the present invention.

As the use of electric motors in vehicle applications increases, detection of potential deviation from desired motor performance is needed. This is true especially when the motor is used in harsh conditions typically experienced by motors as vehicle components. To assist in understanding the present invention, it is described in a hybrid electric vehicle (HEV) application. FIG. 1 demonstrates one possible HEV configuration, specifically a parallel/series hybrid electric vehicle configuration.

The hybrid electric vehicle powertrain of one embodiment of the invention has a configuration, as shown in FIG. 1. A vehicle system controller 10, a battery 12 and a transaxle 14, together with a motor-generator subsystem, comprise a control area network (CAN). An engine 16, controlled by controller 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34 and 36. A torque output shaft 38 for the transaxle is drivably connected to vehicle traction wheels 40 through a differential-and-axle mechanism 42.

Gears 30, 32 and 34 are mounted on a countershaft, the gear 32 engaging a motor-driven gear 44. Electric motor 46 drives gear 44, which acts as a torque input for the countershaft gearing.

The battery 12 delivers electric power to the motor through power flow path 48. Generator 50 is connected electrically to the battery and to the motor in known fashion, as shown at 52.

When the powertrain battery 12 is acting as a sole power source with the engine off, the torque input shaft 18 and the carrier assembly 26 are braked by an overrunning coupling 53. A mechanical brake 55 anchors the rotor of generator 50 and the sun gear 24 when the engine is on and the powertrain is in a parallel drive mode, the sun gear 24 acting as a reaction element.

In FIG. 1, the vehicle system controller 10 receives a signal from a transmission range selector 63, which is distributed to transmission control module 67, together with a desired wheel torque, a desired engine speed and a generator brake command, as shown at 71. A battery contactor or switch 73 is closed after vehicle "key-on" startup. The controller 10 issues a desired engine torque request to engine 16, as shown at 69, which is dependent on accelerator pedal position sensor output 65.

A brake pedal position sensor distributes a wheel brake signal to controller, as shown at 61. The transmission control module issues a generator brake control signal to generator brake 55. It also distributes a generator control signal to generator 50.

As mentioned previously, there are two power sources for the driveline. The first power source is a combination of the engine and generator subsystems, which are connected together using the planetary gear unit 20. The other power source involves only the electric drive system including the motor, the generator and the battery, where the battery acts as an energy storage medium for the generator and the motor.

Fuel is delivered to the engine 16 under the control of the operator in known fashion using an engine throttle. Engine power delivered to the planetary gear unit 20 can be expressed as $T_e\omega_e$, where $T_e$ is engine torque and $\omega_e$ is engine speed. Power delivered from the planetary ring gear to the countershaft gears can be expressed as $T_r\omega_r$, which is the product of ring gear torque and ring gear speed, respectively. Power out from the transmission 14 can be expressed by the symbols $T_s$ and $\omega_s$, the torque of shaft 38 and the speed of shaft 38, respectively.

The generator, when it is acting as a motor, can deliver power to the planetary gear unit 20. Alternatively, it can be driven by the planetary gearing. Similarly, power distribution between the motor and the countershaft gears can be distributed in either direction. Driving power from the battery or charging power to the battery is represented by the power flow path 48.

Engine output power can be split into two paths by controlling the generator speed. The mechanical power flow path, $T_r\omega_r$, is from the engine to the carrier to the ring gear to the countershaft. The electrical power flow path is from the engine to the generator to the motor to the countershaft. The engine power is split, whereby the engine speed is disassociated from the vehicle speed during a so-called positive split mode of operation. A portion of the planetary gearing power is distributed to the generator 50, which delivers charging power to the battery 12. The speed of the generator is greater than zero or positive, and the generator torque is less than zero. The battery drives the motor 46, which distributes power to the countershaft. This arrangement is a positive split.

If the generator, due to the mechanical properties of the planetary gear unit, acts as a power input to the planetary gear unit to drive the vehicle, the operating mode can be referred to as a negative split. The generator speed then is negative and the generator torque also is negative.

The generator delivers power to the planetary gear unit 20 as the motor 46 acts as a generator and the battery 12 is charging. It is possible, however, that under some conditions the motor may distribute power to the countershaft gearing if the resulting torque at the wheels from the gearing does not satisfy the driver demand. Then the motor must make up the difference.

If the generator brake 55 is activated, a parallel operating mode is established. The battery 12 then powers the motor 46, which powers the countershaft gearing simultaneously with delivery of power from the engine to the planetary gearing to the countershaft gearing.

The first source of power can deliver torque only for forward propulsion because there is no reverse gear in the countershaft gearing. The engine requires either generator control or a generator brake to permit transfer of power to the wheels for forward motion.

The second source of power, previously described, is the battery, generator and motor subsystem. In this driving mode, the engine is braked by the overrunning coupling 53. The electric motor draws power from the battery and effects propulsion independently of the engine, with either forward or reverse motion. The generator may draw power from the battery and drive against a reaction of the one-way coupling 53. The generator in this mode operates as a motor.

The invention first will be described with reference to a three-phase electric motor. That will be followed by a description of the invention as applied to an electric motor with more than three phases; i.e., "n" phases.

Figure 2:
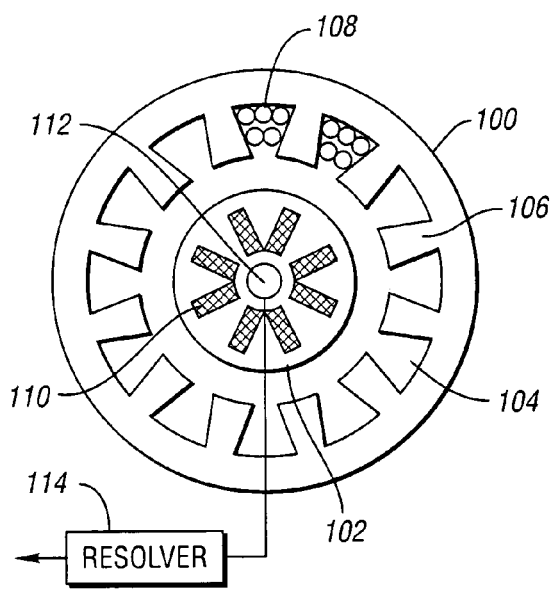
FIG. 2 illustrates an electric traction motor for the hybrid electric vehicle shown in FIG. 1.
Figure 3:
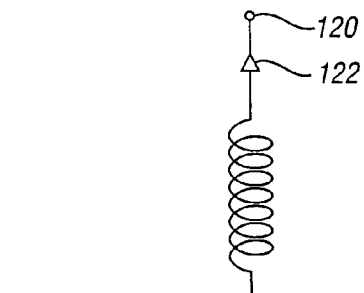
FIG. 3 illustrates electric motor stator windings connected in a "wye" configuration for use in the traction motor of FIG. 1.

A basic diagram of a three-phase motor 46 is illustrated in FIG. 2. The traction motor 46 has a stator 100, having slots 104 and teeth 106. Motor windings 108 carry electric current through the traction motor 38. The windings are connected in a "wye" configuration, as illustrated in FIG. 3. Interior to stator is the rotor 102. The rotor 102 has permanent interior magnets 110. The motor shaft 112 passes through the rotor 102. A resolver 114 can be connected to the motor shaft 112.

The windings 108 of a three phase electric motor can be represented as being arranged in a "wye." Each of the three phases, commonly referred to as phase "a," "b," and "c" is represented by one leg of the "wye." The "wye" configuration is illustrated in FIG. 3. Phase "a" 120 would have a corresponding electric current, current "a" ($1_a$) 122, passing through it. Similarly, phases "b" 124 and "c" 128 would have corresponding electric currents, current "b" ($1_b$) 126 and current "c" ($1_c$) 130, respectively, passing through them as well. Measurement or estimation of all three motor phase currents (122, 126, and 130) and the motor shaft 112 position angle is required to calculate the motor torque.

In the case of a three phase electric motor, the controller 10 can detect the motor's operating condition generally by two procedures (shown in FIGS. 4 and 5) using alternate types of independent estimations of machine torque. For the embodiments presented, four current sensors per electric motor are used. Many other types of configurations are possible. Sensor output can be sent to the controller 10, where appropriate actions may be taken, such as lighting an indicator lamp or sounding an indicator tone to notify the operator of a potential system deviation from desired electrical operating conditions.

Figure 4:
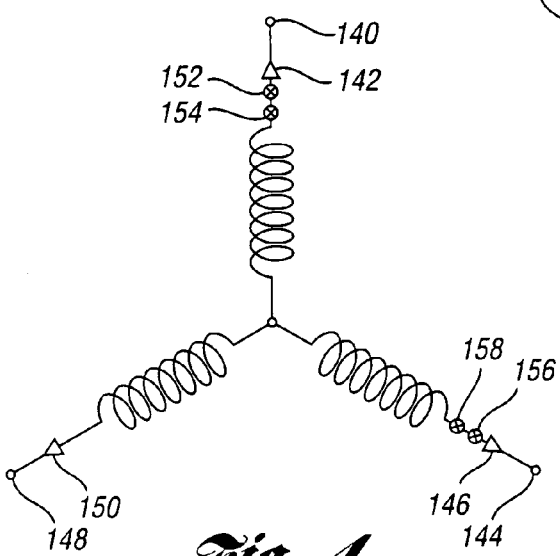
FIG. 4 illustrates an arrangement of four current sensors having two sensors in each of two phases, which is used in practicing the present invention.

FIG. 4 shows a first embodiment of the present invention. FIG. 4, like FIG. 3, shows the "wye" configuration of the three phases of the electric motor. In practice, any individual leg of the "wye" can be any of the individual phases. In FIG. 4, the phases will be referred to as phases x, y, and z, where phases x, y, and z can be any ordering of phases a, b, or c. Phase x 140 would have a corresponding electric current, current x ($I_x$) 142, passing through it. Similarly, phases y 144 and z 148 would have corresponding electric currents, current y ($I_y$) 146 and current z ($I_z$) 150, respectively passing through them as well.

Added to the "wye" configuration are four current sensors. The first current sensor 152 gives a measured current x ($i_x$). The second current sensor 154 gives a second measured current x ($i_x'$). The third current sensor 156 gives a measured current y ($i_y$). The fourth current sensor 158 gives a second measured current y ($i_y'$). These sensors can be of any type known in the art for measuring motor phase current, such as a resistive shunt or non-contacting current transducers and can be either active or passive.

Figure 5:
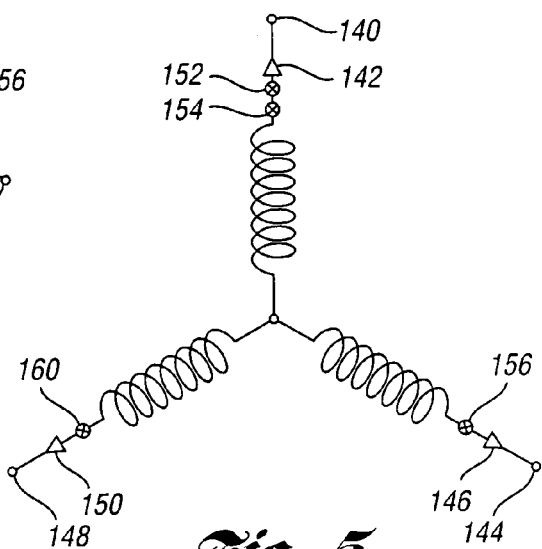
FIG. 5 illustrates an alternate arrangement of four current sensors, which may be used in practicing the present invention.

FIG. 5 shows an alternate arrangement of four current sensors on the legs of the "wye" configuration representing the phases of the electric motor. In this embodiment the first current sensor 152 gives a measured current x ($i_x$). The second current sensor 154 gives a second measured current x ($i_x'$). The third current sensor 156 gives a measured current y ($i_y$). The fourth current sensor 160 gives a measured current z ($i_z'$).

Figure 6:
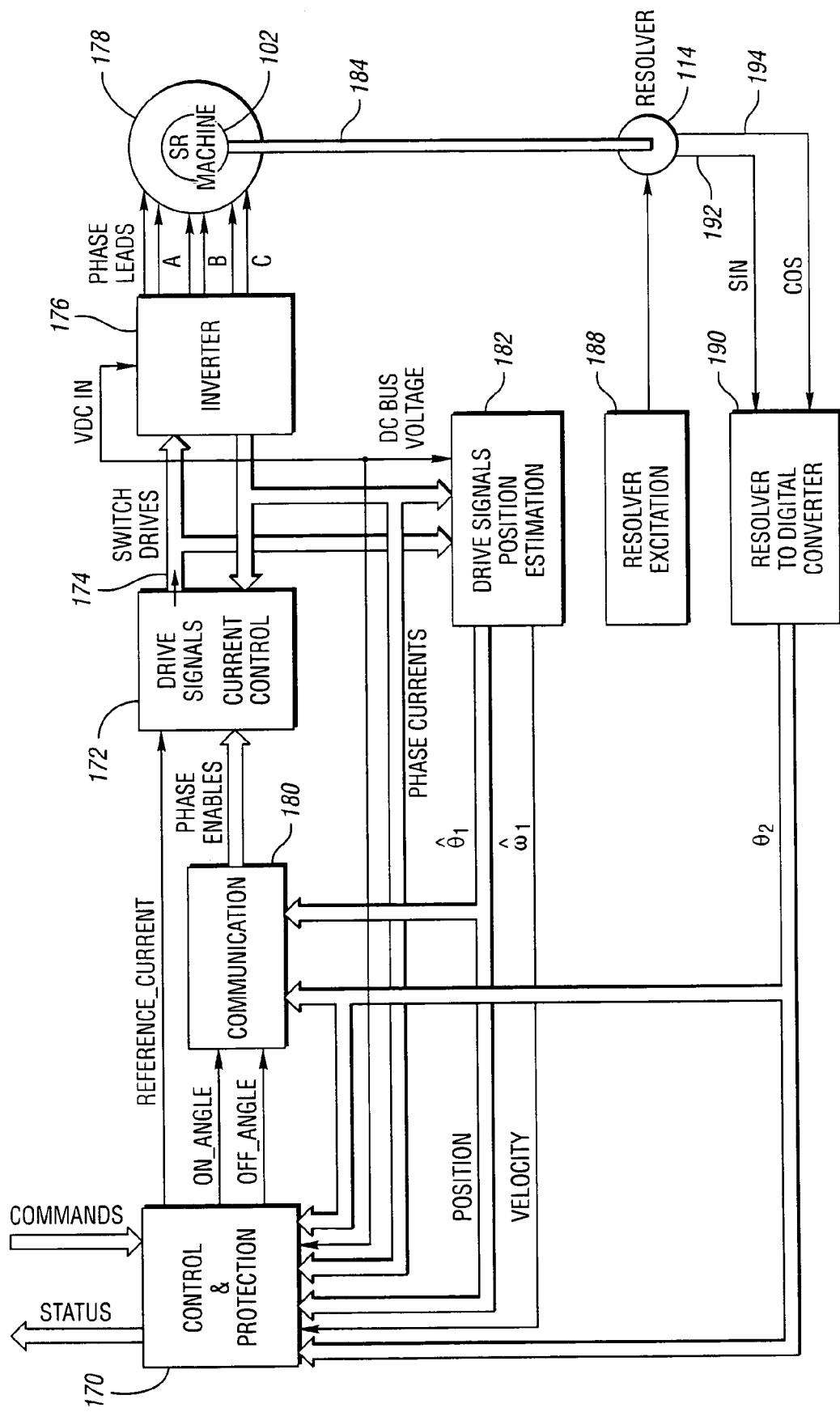
FIG. 6 illustrates the strategy of the present invention in block diagram form.

FIG. 6 illustrates a possible strategy using the present invention in block diagram form. An inverter control for operating a switched reluctance machine 178 includes the resolver 114 coupled by a motive power shaft 184 to the rotor 102 of the switched reluctance machine 178. Excitation is provided by a resolver excitation circuit 188. The resolver 114 develops first and second signals over lines 192 and 194 that have a phase quadrature relationship (also referred to as sine and cosine signals). A resolver-to-digital converter 190 is responsive to the magnitudes of the signals on the lines 192 and 194, and it develops a digital output representing the position of the rotor 102 of the switched reluctance machine 178. The position signals are supplied along with a signal representing machine rotor 102 velocity to a control and protection circuit 170. The rotor 102 position signals are also supplied to a commutation circuit 180 and a current control circuit 172 having an input coupled to an output of the control and protection circuit 170. Circuits 170 and 172 further receive phase current magnitude signals as developed by an inverter 176. The circuits 170 and 172 develop switch drive signals on lines 174 for the inverter 176 so that the phase currents flowing in the windings of the switched reluctance machine 178 are properly commutated. A position estimation circuit or subsystem 182 is responsive to the phase current magnitudes developed by the inverter 176, switch control or drive signals for switches in the inverter 176 and DC bus voltage magnitude to develop position and velocity estimate signals for the control and protection circuit 170. In addition, the position estimate signals are supplied to the commutation circuit 180.

The current control circuit 172 is responsive to the phase current magnitudes developed by the inverter 176, as well as phase enable output signals developed by the commutation circuit 180 and a reference current signal developed by the control and protection circuit 170. The current control circuit 172 produces the switch control or drive signals on lines 174 for the inverter 176. Measurements from these systems allow the development of strategies to estimate normal traction motor 46 torque.

The resolver 114, known in the prior art, is a direct measurement of rotor 102 position angle. A Kalman filter based estimation method, also known in the art, can generate a second independent calculation of the rotor 102 position angle in electric and hybrid-electric vehicles.

Currents "a" 122, "b" 126, and "c" 130 in the three phases of the "wye" {"a" 120, "b" 124, and "c" 128} are actively switched at high frequency by the three phase inverter 176 between the motor windings 108 and a direct current voltage source, such as the battery 12.-

The traction motor 46 has the ideal torque "T" characteristic as follows:

$$T = \frac{3}{4}p[MI_f I_q + (L_d - L_q)I_d \cdot I_q] \quad (1)$$

where
p is the number of motor poles (known),
M is the rotor to stator mutual inductance (known.),
$I_f$ is the "equivalent" current corresponding to the permanent magnet magnetic flux (known),
$L_d$ is the direct axis inductance (known),
$L_q$ is the quadrature axis inductance (known),
$I_d$ is the "direct" axis current (estimated from measured and other values), and
$I_q$ is the "quadrature" axis current (estimated from measured and other values).

To generate relative currents $\{I_d, I_q\}$ in a frame that rotates at the rotor velocity, we can write:

$$I_d = \frac{2}{3}[I_a\cos\theta + I_b\cos(\theta - \gamma) + I_c\cos(\theta + \gamma)] \quad (2)$$

$$I_q = \frac{2}{3}[I_a\sin\theta + I_b\sin(\theta - \gamma) + I_c\sin(\theta + \gamma)] \quad (3)$$

where:
$I_a$, $I_b$, $I_c$ are the stator "wye" coil currents 122, 126, and 130.
θ is the rotor position angle, and
γ is the electrical phase angle between stator coils, and
where:

$$\gamma = \frac{2}{3}\pi = 120 \text{ deg}.$$

To generate two independent estimates of electrical machine torque by using Equation 1, two independent ways to find $I_d$ and $I_q$ are required. These currents in turn each depend upon two signals sets:
1. the "wye" connected stator phase coil currents $\{I_a$ 122, $I_b$ 126, $I_c$ 130$\}$, and
2. the motor shaft 112 position angle θ.

At least two independent strategies are described to independently estimate each of these two signal sets. For the first strategy, assume each of the three legs of the stator coil has current flowing in that leg. The machine winding neutral at the center of the "wye" is not connected, which is true for the case of inverter driven motors. Because Kirchoff's current law, known to those skilled in the art, applies to the "wye" connected circuit, the currents $\{I_a$ 122, $I_b$ 126, $I_c$ 130$\}$ obey the relationship:

$$I_a + I_b + I_c = 0. \quad (4)$$

Only two currents need to be known to estimate the third current.

For example, if $\{i_a, i_b, i_c\}$ represent current sensor outputs measuring the currents $\{I_a$ 122, $I_b$ 126, $I_c$ 130$\}$, by measuring any two, for example $\{i_a, i_b\}$, one can estimate the third $i_c$ as Equation 5:

$$\hat{i}_c = -(i_a + i_b)$$

where $\hat{i}_c$ represents an estimated, not measured, output signal. By using two current sensors, we have estimated the three phase stator currents as $\{i_a, i_b, \hat{i}_c\}$.

To generate a redundant and completely independent second strategy to estimate stator currents, we cannot rely on either sensor indicating $\{i_a, i_b\}$. Instead we can redundantly measure $\{i_a, i_b\}$ with two additional sensors $\{i_a', i_b'\}$ as in FIG. 4, and apply Equation 5 to generate the second estimate of $i_c'$ as:

$$\hat{i}_c' = -(i_a' + i_b').$$

Alternatively, we might choose to measure $i_c'$ directly as in FIG. 5, and either of $\{i_a', i_b'\}$ directly, then apply Equation 5 to estimate the remaining current such as:

$$\hat{i}_b' = -(i_a' + i_c'), \text{ or}$$

$$\hat{i}_a' = -(i_b' + i_c').$$

This dual stator current estimation is summarized in Table 1, where $\{x,y,z\}$ are any ordering of the stator coils $\{a,b,c\}$.

TABLE 1

Alternate Ways to Estimate One of the Three Stator Currents

| Actual Current | Independent Strategy 1: Use sensors and estimators | Independent Strategy 2: Use any column of sensors and estimators | | |
|---|---|---|---|---|
| $I_x$ 142 | $i_x$ | $i_x'$ | $i_x'$ | $-(i_y' + i_z')$ |
| $I_y$ 146 | $i_y$ | $i_y'$ | $-(i_x' + i_z')$ | $i_y'$ |
| $I_z$ 150 | $-(i_x + i_y)$ | $-(i_x' + i_y')$ | $i_z'$ | $i_z'$ |

Referring to the table, the far left column of Independent Strategy 2 redundantly measures the same two phase currents $\{x$ 142, $y$ 146$\}$ as does Independent Strategy 1. Putting two current sensors in the same leg may simplify the sensor packaging if two sensors, $\{x$ 152, $x'$ 154$\}$ for example, can share any of their non-critical components. Such non-critical components can include passive parts such as a sensor housing, mounting fasteners, ferrite core and electrical connector housing. In this case, Equation 4 can be validated as Equation 7 as follows:

$$i_x + i_y + -(i_x' + i_y') = 0 \quad (17)$$

Furthermore, sensors in the same leg can be cross-checked as Equation 8 as follows:

$$(i_x - i_x') = 0,$$

$$(i_y - i_y') = 0.$$

Any stray current leakage in coil c (due to short circuit faults in wiring to the coil, the coil drivers, and between the coil windings and the stator core) is not explicitly sensed.

Alternatively, the right two columns of Independent Strategy 2 redundantly measure only one of the two phase currents $I_x$ 142 or $I_y$ 146 as measured in Independent Strategy 1. The other phase current $I_z$ 150, has a separate sensor 160 to generate signal $i_z'$, resulting in three unique signals $\{i_x, i_y, i_z'\}$ to verify Equation 4 as Equation 9 as follows:

$$i_x + i_y + i_z' = 0.$$

If either of the last two columns in the table are selected, any stray current leakage in stator coil c is explicitly sensed, which may enable detection of additional faults causing current leakage in stator coil c.

In using a total of four current sensors on two or three legs of the traction motor's "wye" windings as in FIGS. 4 and 5, all three current measurements can be generated in two independent ways, and cross-checked to detect whether any one or more measurements should be faulted.

All present inverter motor control technologies require the rotor 102 position θ according to Equations 2 and 3. Motor shaft 112 angle θ can be measured directly by a sensor called the resolver 114, or estimated using an observer or Kalman filter based upon the measured motor currents.

An alternate embodiment of the present invention adds the resolver 114 to the embodiment described above. Traditionally, inverter torque motor controls use the resolver 114, composed of a "toothed" ring consisting of a plurality of teeth rotating with the motor shaft 112 being measured, and one or more stationery "tooth" sensors of some technology, be it optical, variable reluctance, Hall effect, or other technology known in the art. If one "toothed" ring and one sensor are used, the resolver 114 is also called a "tone wheel." The tone wheel measures relative position, and it is not capable of sensing direction of travel. Some "tone wheels" omit a tooth as a reference absolute position, but measurement is only relative, so measurement during changes of direction is impossible. If two "tooth" sensors are used, the resolver 114 can sense direction, but it still cannot measure absolute position. If more than two "tooth" sensors are used, the resolver 114 can sense direction and absolute position. Some drawbacks of resolvers are their expense, high failure rates, and requirement of a high speed interface at the microprocessor that receives their output signals.

Methods have been developed to estimate the motor shaft 112 position. The estimate being derived not from a resolver 114, but from implicit characteristics of the motor. One such characteristic of an inductance motor is the mutual inductance between the stator coils and the induced current in the rotor 102, which is dependent upon the relative angle between the two and can be estimated from the motor phase currents {$I_a$ 122, $I_b$ 126, $I_c$ 130}. Another characteristic that can be used to estimate motor shaft 112 position is the back EMF of the motor, known to those skilled in the art as a voltage across the coil that increases with motor speed.

There are well-documented methods that capitalize on these position dependent motor characteristics to estimate the motor shaft 112 relative position. One method is an observer. Another method is a special case of observer called a Kalman filter. In general the observer will compute by Equation 10:

$$\hat{\theta} = F(s)(I_a, I_b, I_c)$$

where F(s) is the observer transfer function.

To generate separate and independent estimates of motor shaft 112 position, generate a first estimate using the stator current estimation approach Independent Strategy 1 given above, and a second estimate using the Independent Strategy 2. The combined current and motor shaft 112 position measuring method can detect all single deviations from a desired operating condition and is robust in that it can enable safe, if not complete, operation even when such deviations occur and are detected.

Alternatively, one independent motor shaft 112 angle may be measured with a resolver 114, and a second independent motor shaft 112 angle may be estimated using the proposed observer or Kalman filter and either of the phase current measuring proposals.

A more generalized control strategy now will be described. It is applicable to an electric motor having a number of phases greater than three. It can be described, therefore, as a strategy for a polyphase system.

A polyphase system is defined as an "n" phase system, where n=2, 3, 4 . . . , n. In the following equations we replace the symbols $I_a$, $I_b$, $I_c$ by $I_1$, $I_2$, $I_3$ to accommodate n currents, i.e., use $I_1, I_2, I_3, I_4, \ldots I_n$. This electric machine has the ideal torque characteristic (this equation remains same).

$$T = \frac{3}{4} p[MI_f I_q + (L_d - L_q)I_d I_q], \qquad (11)$$

where
p is the number of motor poles (known),
M is the rotor to stator mutual inductance (known),
$I_f$ is the "equivalent" current corresponding to the permanent magnet magnetic flux (known),
$L_d$ is the direct axis inductance (known),
$L_q$ is the quadrature axis inductance (known),
$I_d$, is the "direct" axis current (estimated from measured and other values), and
$I_g$ is the "quadrature" axis current (estimated from measured and other values).

To generate relative currents {$I_d$, $I_q$} in a frame that rotates at the rotor velocity, we can write $$I_d = \frac{2}{3}[I_1\cos\theta + I_2\cos(\theta - \gamma) + I_3\cos(\theta - 2\gamma) + \qquad (12)$$
$$I_4\cos(\theta - 3\gamma) + \ldots + I_n\cos(\theta - (n-1)\gamma)]$$

$$I_q = \frac{2}{3}[I_1\sin\theta + I_2\sin(\theta - \gamma) + \qquad (13)$$
$$I_3\sin(\theta - 2\gamma) + I_4\sin(\theta - 3\gamma) + \ldots + I_n\sin(\theta - (n-1)\gamma)]$$

where
$I_1, I_2, I_3, I_4, \ldots, I_n$ are the stator coil currents.
θ is the rotor position angle, and
γ is the electrical phase angle between stator coils, and where $$\gamma = \frac{2}{n}\pi$$

Dual Torque Estimation

To generate two independent estimates of electrical machine torque by using equation (11), there are two independent ways to find {$I_d$, $I_q$}. These currents in turn each depend upon two signal sets:
1. the stator phase coil currents and
2. the rotor shaft position angle θ.

In what follows, at least two independent methods are described to independently estimate each of these two signal sets.

Independent Dual Measurement/Estimation of Wye Stator Coil Currents $$I_1 + I_2 + I_3 + I_4 + \ldots + I_n = 0 \qquad (14)$$

Only two currents need to be known to estimate a third. For example, if {$i_1, i_2, i_3, \ldots$} represent current sensor outputs measuring the currents {$I_1, I_2, I_3, \ldots$}, by measuring any two, for example {$i_1, i_2$}, one can estimate the third $I_3$ as:

$$\hat{i}_n = -(i_1 + i_2 + i_3 + i_4 + \ldots + i_{n-1}) \qquad (15)$$

where $\hat{i}_n$ represents an estimated, not measured, output signal.

$$i_n' = -(i_1' + i_2' + i_3' + i_4' + \ldots i_{n-1})  \quad (16)$$

$$(i_1 + i_2 + i_3 + i_4 + \ldots i_{n-1}) - (i_1' + i_2' + i_3' + i_4' + \ldots + i_{n-1}') = 0 \quad (17)$$

Furthermore, sensors in the same leg can be crosschecked as $$(i_1 - i_1') = 0,$$

$$(i_2 - i_2') = 0$$

$$(i_{(n-1)} - i_{(n-1)}') = 0 \quad (18)$$

$$(i_1 + i_2 + i_3 + i_4 + \ldots + i_{n-1}) + i_n' = 0 \quad (19)$$

$$\hat{\theta} = F(s)(I_1, I_2, I_3, I_4, \ldots I_n) \quad (20)$$

where $F(s)$ is the observer transfer function.

The embodiments of the invention described above are provided for purposes of example. Variations and modifications of the invention may be made by persons skilled in the art without departing from the scope of the invention. All such variations and modifications, as well as equivalents thereof, are intended to be covered by the following claims.

What is claimed:

1. A diagnostic system for a polyphase electric motor with n phases, the system comprising:
   a first subsystem to determine first currents of each motor phase;
   a second subsystem to determine a first value of motor shaft position;
   a third subsystem to estimate a first value of motor torque using the first currents and the first value of motor shaft position;
   a fourth subsystem to determine second currents of each motor phase;
   a fifth subsystem to determine a second value of motor shaft position;
   a sixth subsystem to estimate a second value of motor torque, independent of the first estimate of motor torque, using the second currents and the second value of motor shaft position; and
   a comparator system to compare the first and second estimates of motor torque.

2. The diagnostic system according to claim 1 further comprising an operator notification system whereby a discrepancy between the first and second motor torque estimates is indicated.

3. The diagnostic system according to claim 1, wherein the first subsystem comprises:
   a first current sensor of a first set of n–1 current sensors for determining a first measured current of a first of phases of the electric motor;
   a second current sensor of the first set of n–1 current sensors for determining a first measured current of a second of n–1 phases of the electric motor;
   other current sensors of the first set of n–1 current sensors for determining a first measured current of each of the other n–1 phases of the electric motor; and
   a system to estimate a first current of an $n^{th}$ phase of the electric motor, including second and third phases, based on the first measured currents for the n–1 current sensors.

4. The diagnostic system according to claim 1 wherein the second subsystem is a Kalman filter.

5. The diagnostic system according to claim 1 wherein the fourth subsystem comprises:
   a first current sensor of a second set of n–1 current sensors for determining a second measured current of a first of n–1 phases of the electric motor;
   a second current sensor of the second set of n–1 current sensors for determining a second measured current of a second set of n–1 phases of the electric motor;
   other current sensors of the second set of n–1 current sensors for determining a second measured current of each of the other n–1 phases of the electric motor; and
   a system to estimate a second current of an $n^{th}$ phase of the electric motor, including second and third phases, based on the second measured currents for the second set of n–1 current sensors.

6. The diagnostic system of claim 1 wherein the fifth subsystem includes a resolver.

7. The diagnostic system set forth in claim 1 wherein the first and fourth subsystems include n–1 current sensors for each of two motor torque estimates, where n=the number of phases, greater than one, of the electric motor.

8. A method to diagnose potential discrepancies in electrical operating characteristics of a polyphase electric motor comprising the steps of:
   determining a first set of currents for each motor phase with n–1 first current sensors, where n is any number of phases greater than one;
   determining a first value of motor shaft position;
   estimating a first value of motor torque using the first value of motor shaft position and the first set of currents;
   determining a second set of currents for each motor phase with n–1 current sensors;
   determining a second value of motor shaft position;
   estimating a second value of motor torque, independent of the first estimate of motor torque, using the second value of motor shaft position and the second set of currents; and
   comparing the first and second estimates of motor torque.

9. The method according to claim 8 further comprising the step of notifying a motor operator of a potential discrepancy in electrical operating conditions.

10. The method according to claim 8 wherein the step of determining a first set of currents for each motor phase comprises:
    determining a first set of currents of n–1 phases of the electric motor with a set of n–1 current sensors;
    determining a second set of currents of n–1 phases of the electric motor with a set of n–1 current sensors; and
    estimating two independent currents of an $n^{th}$ phase of the electric motor, including second and third phases, based on the first and second sets of currents of the n–1 phases of the electric motor.

11. The method according to claim 8 wherein the step of determining the first estimate of motor shaft position is accomplished by using a Kalman filter.

12. The method according to claim 8, wherein the step of determining a second value of motor shaft position is accomplished by using a resolver.

13. The method set forth in claim 8 wherein each step of generating independent estimates of motor torque comprises the use of n–1 current sensors for each torque estimate.

14. A controller in a system for diagnosing potential discrepancies in electrical operating conditions in a polyphase electric motor, the controller comprising:

a sub-system (172, 152, 154, 156, 158) to determine current in each motor phase;
a sub-system (182, 190) to determine first values of motor shaft position;
a sub-system (67, 176, 178) for generating a first estimate of motor torque using the current in each motor phase and the first value of motor shaft position;
a sub-system (182, 190) to determine a second value of motor shaft position;
a sub-system (67, 190, 114) for generating a second estimate of motor torque using current in each motor phase and a second value of motor shaft position; and
a sub-system (67) for comparing the first and second estimates of motor torque for discrepancies whereby a motor operator can be notified of a potential discrepancy in electrical operating characteristics.

\* \* \* \* \*